Nov. 25, 1958     L. T. WHITEHEAD     2,861,775
TUBULAR BLADES

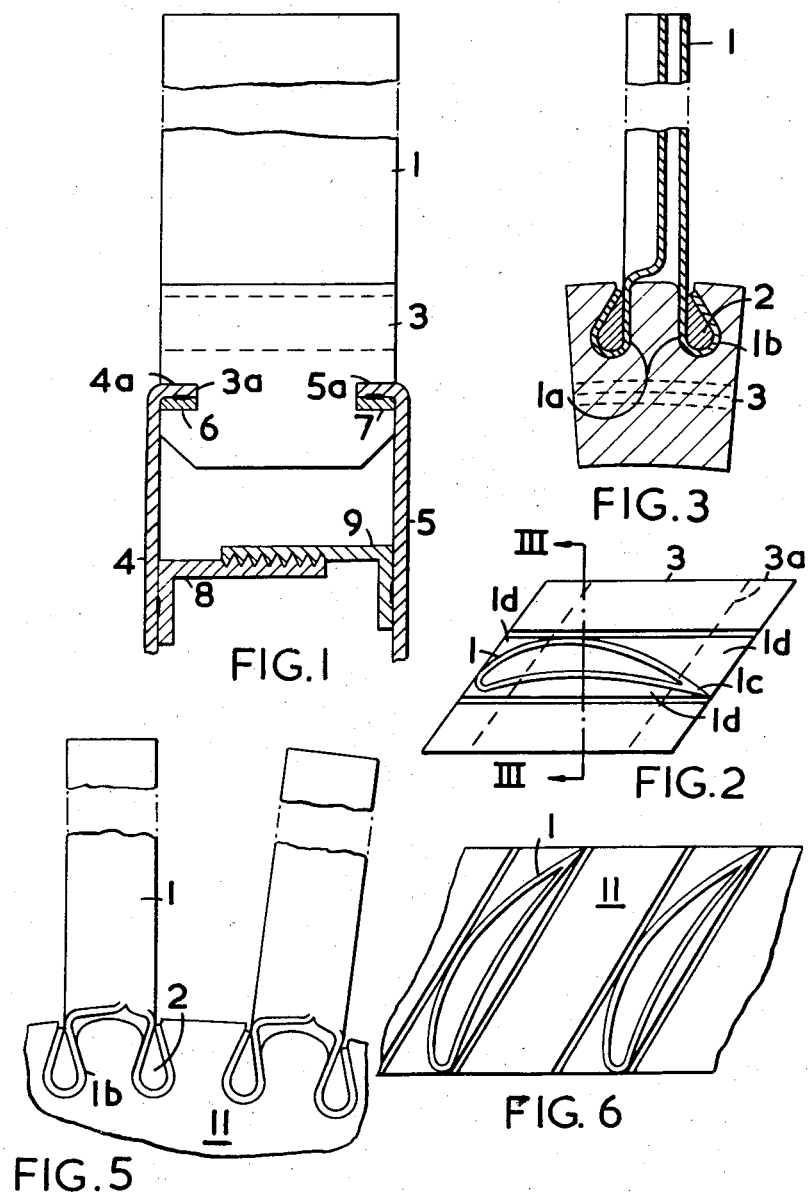

Filed May 24, 1954     3 Sheets-Sheet 2

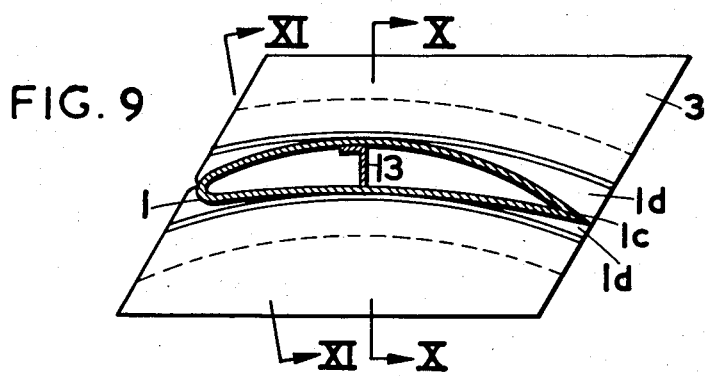
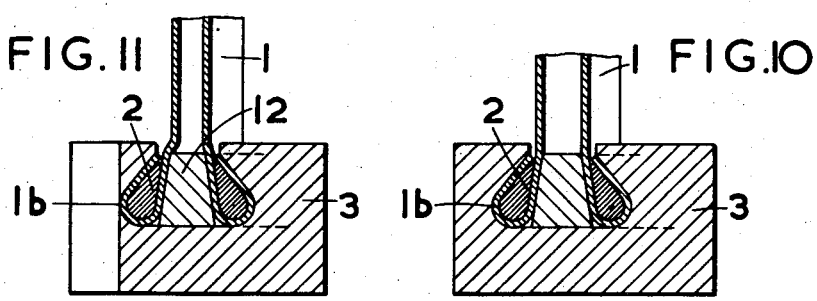
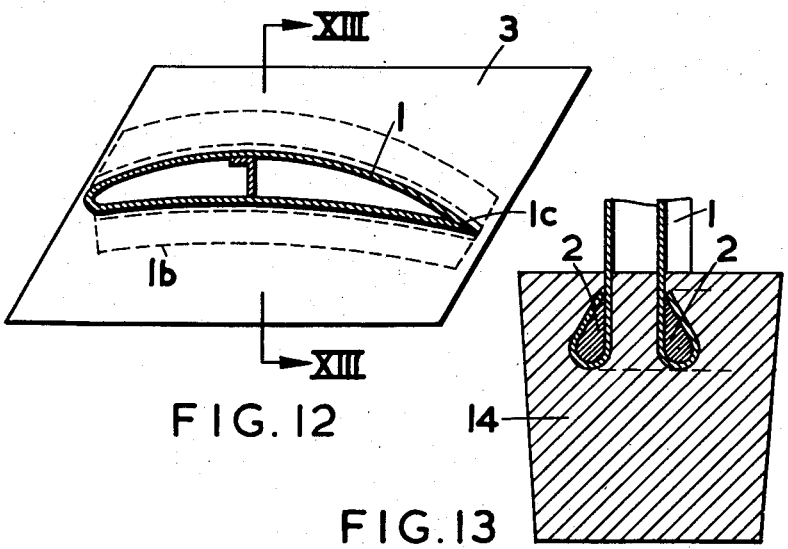

United States Patent Office 2,861,775
Patented Nov. 25, 1958

2,861,775

TUBULAR BLADES

Leslie Thomas Whitehead, Farnborough, England, assignor to Power Jets (Research and Development) Limited, London, England, a British company Application May 24, 1954, Serial No. 431,925

Claims priority, application Great Britain June 4, 1953

7 Claims. (Cl. 253—77)

This invention relates to blades for bladed rotary machines such as elastic fluid turbines and compressors. Such blades may be hollow and may be made from tubular material of the required cross-section or from sheet material bent around a former and welded or otherwise secured along the seam to form a tube of the required cross-section. A difficulty arises however in securing such blades to the rotor, and the present invention is concerned with the provision of a root fixing for such blades, the invention is thought to be particularly, though not exclusively, applicable to blades for axial flow compressors.

Accordingly the invention provides a blade comprising a blade part proper having a tubular working portion and a portion at its root end which is formed into a loop fitting closely around a wire extending transversely to the blade axis and engaging in an undercut groove in a rotor element, the loop, wire and groove being wedged-shaped in cross-section with the apex of the wedge pointing towards the tip end of the blade, and the sides of the loop bearing against the sides of the groove.

According to a feature of the invention the blade has at its root end two opposed sides spaced apart, each being formed into a loop fitting closely around a wire and engaging in an undercut groove in the rotor element. In a blade of aerofoil cross-section, these sides are formed one at the root end of each face of the blade.

A number of specific embodiments of the invention will now be described by way of example with reference to the accompanying drawings, of which:

Figure 1 is an axial section of the peripheral part of a single stage axial flow compressor rotor carrying a row of rotor blades.

Figure 2 is a plan view of one of the blades shown in Figure 1.

Figure 3 is a section on the line III—III in Figure 2.

Figure 5 is a fragmentary end elevation of a bladed compressor rotor.

Figure 6 is a developed view of the periphery of the rotor shown in Figure 5.

Figure 9 is a plan view of another embodiment of the invention.

Figures 10 and 11 are sections on the lines X—X and XI—XI in Figure 9 respectively.

Figure 12 is a plan view of yet another embodiment.

Figure 13 is a section on the line XIII—XIII in Figure 12.

Figure 4:
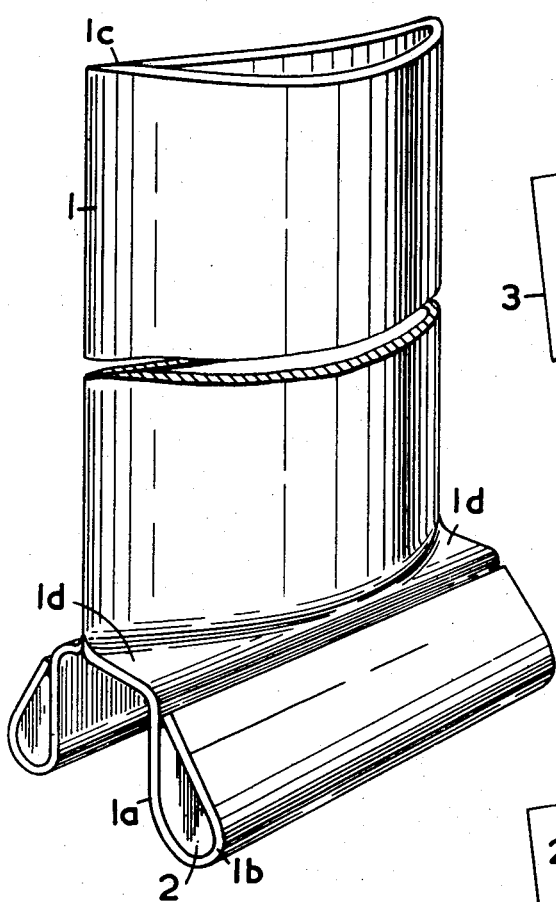
Figure 4 is a perspective view of part of the blade shown in Figures 1, 2 and 3.

Referring now to Figures 1 to 4, a blade for an axial flow compressor rotor comprises a tubular blade part proper 1 made from sheet metal bent to the required aerofoil cross-section on a former and welded or otherwise secured along the seam at the trailing edge as shown at 1c. The welding is not carried right down to the root end of the blade, but a length at this end is left unwelded to form a slit, while a slit of the same length is made in the leading edge of the blade at the root end.

The part of the blade above the level of the top of the slits constitutes the working portion of the blade, i. e. the part lying in the air flow through the compressor.

The portions of the two faces of the blade part 1 below the top of these slits are deformed from their original aerofoil shape to form two opposed parallel flattened sides 1a extending substantially in a chord-wise direction. At the bottom of the working part of the blade the flattened portion on the convex face is more or less tangential to that face, while on the concave face, the flattened portion lies approximately along the chord line of the blade. The distance apart of the flattened sides is approximately equal to the maximum camber of the blade. The flattened sides are joined to the working portion of the blade by platforms 1d.

The lower portion of each of the flattened sides 1a is bent outwardly and upwardly around a wire 2 extending chordwise transversely to the blade axis, so that it forms a loop 1b fitting closely around and corresponding is cross-section to the wire. The wire is essentially wedge-shaped in cross-section with the apex pointing radially outwardly, i. e., towards the tip of the blade, its section being bounded by two straight lines intersecting at one end and joined by a circular arc (somewhat greater than a semi-circle) at the other end. The wire may thus be said to be pear-shaped in cross-section. The working part of the blade is accordingly provided with two chordwise extending dovetails one at the bottom of each face.

The blade further comprises a root block 3 having formed in its upper surface two longitudinally extending parallel grooves, each undercut on one side, and corresponding in cross-section and spacing to the cross-section and spacing of the dovetails on the blade part 1. The dovetails are pushed into these grooves from the end and are a close fit therein so that the sides of the loops bear against the sides of the grooves. The depth of the grooves is such that the platform 1d at the bottom of the aerofoil part of the blade part 1 are approximately level with the upper surface of the block.

The blade is mounted on a rotor (see Figure 1) made up of two sheet metal discs 4, 5 having their peripheries bent towards one another to form axially directed flanges 4a, 5a to which are secured by spot welding reinforcing rings 6, 7. The root block is formed in its end faces with grooves 3a, and the flanges engage in these grooves to retain the blade against centrifugal loads. The discs 4, 5 are further provided with annular brackets 8, 9 having their radially extending arms spot welded to their adjacent faces, and the axially extending arms of the brackets, screwing together to clamp the blade root blocks 3 between the discs. This rotor construction is described in copending application Serial 357,007.

The root block could alternatively be provided with any other root formation, e. g., a fir-tree root, for attachment to a rotor in known manner.

As can be seen from Figure 2, the root blocks are so shaped that the blades are set on the rotor at the required stagger angle. When mounted in the rotor, the side faces of circumferentially adjacent root blocks bear against and support each other.

It will be appreciated that under radial loads the wire 2 acts as a wedge tending to clamp the material of the loop 1b between itself and the wall of the groove. The loop 1b, the wire 2 and the sides of the groove are in engagement over the whole of their surfaces, and so the frictional resistance to relative movement is considerable. The greater the radial load, the greater is the wedging action and so the greater is the frictional resistance to the blade being pulled out around the wire 2. Thus the dovetails cannot be pulled bodily out of the grooves without deforming or fracturing the root block and this tendency is resisted by the side faces of adjacent blocks bearing against and supporting one another as mentioned above.

In the above described embodiment, the blade part 1 engages with a root block 3 which is itself secured to the rotor, but the blade part can alternatively engage directly with the rotor. Referring now to Figure 5, a compressor is provided with a row of hollow blades 1 having flattened portions at their root ends formed into loops 1b in the manner already described. In this case however the flattened portions are first bent towards each other before being bent outwardly and upwardly around the wire 2 so that the loops are symmetrical with respect to a radial plane. However the flattened portions are so bent that any chordwise line on one of them is parallel to any chordwise line on the other so that the dovetails constituted by the loops are of constant cross-section.

The blades are mounted on a solid rotor disc 11 formed with undercut grooves in its peripheral surface conforming in cross-section and spacing to the cross-section and spacing of the dovetails of the blades, which are slid into the grooves from the end. The grooves are in this case undercut on both sides. As can be seen from Figure 6, the grooves are cut at such an angle to the rotor axis that the blades are set at the required stagger angle. The grooves can conveniently be formed by a broaching operation.

Figure 7:
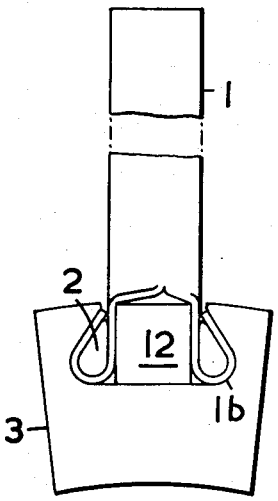
Figures 7 and 8 are end elevations of two alternative constructions of the blade shown in Figures 1 to 4.

The embodiment of Figure 7 differs from that of Figures 1 to 4 in that the block 3 is provided with a single groove undercut on both sides, and corresponding in width to the overall distance between the outside of the loops 1b. The groove is divided longitudinally into two parts by a central plug 12, the dovetails of the blade part 1 engaging in the two grooves so formed.

Figure 8:
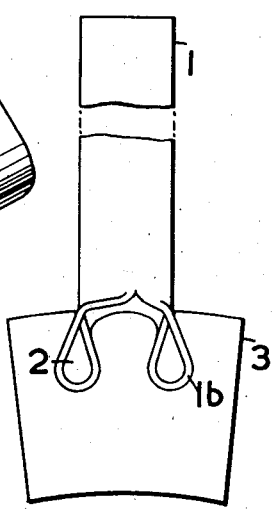

The loops 1b of the blade part 1 shown in Figure 8 are formed by bending the flattened portions inwardly around the wire 2 instead of outwardly as in the previous embodiments. The loops are symmetrical with respect to the radial direction as in the embodiment of Figures 5 and 6.

It will be appreciated that any one of the various formations of the loops described above could be used in conjunction with either a separate root block, as in Figures 1 to 3, or a solid rotor disc as in Figures 5 and 6.

In the above described embodiments, the platforms 1d between the flattened and aerofoil portions of the blade and also the upper surface of the root block 3 lie in a plane normal to the blade axis, but for a tapered rotor, they may be inclined thereto. Similarly where the undercut grooves are cut in a tapered solid rotor, the platforms are inclined to the blade axis at an angle corresponding to the taper of the rotor.

The root blocks in the embodiments described above may conveniently be cut from a length of bar material, extruded to form the dovetail grooves. One suitable material for the bar is magnesium alloy. With some other materials which could be used, e. g., aluminium or titanium alloy, it may not be possible to extrude a bar with the narrow grooves shown in Figures 3 and 8, and in this case it may be preferable to use the construction of Figure 7 in which there is a wider groove with a central plug. The root blocks will be parted off from the bar at such an angle that the blades may be set on the rotor at the required stagger angle as shown in Figure 2.

In all the above-described embodiments, the loops 1b and the wire 2 are not curved in a chordwise sense. This arrangement necessitates the platforms 1d between the flattened portions 1a and the blade 1, and, especially in a highly cambered blade, these platforms may be of considerable extent. The platforms are subject to bending and stress concentrations are set up. In the embodiment of Figures 9 to 11, the loops 1a and the wire 2 are curved in plan, both following circular arcs about a common centre. Accordingly it is possible to eliminate the platform 1d altogether for part of the blade chord as shown in Figure 10, and to reduce the area of the platforms at the leading and trailing edges.

The loops fit into an undercut groove in a root block 3 which is divided longitudinally by a central plug 12 as in the embodiment of Figure 7, both the groove and plug being curved in plan to conform to the curvature of the loops. The groove is of constant width so that loops can be slid in from the end as in the other embodiments. The groove in the block is formed by a milling operation. The plug 12 is slightly tapered so that it is retained against centrifugal force.

The blade part 1 is further provided with an internal stiffening web 13 which is of angle section, one arm being spot or stitch welded to the inside of one face of the blade and the arm having its edge in contact with the inside of the other face.

In a modification, the loops may follow the contour of the blade for part of the blade chord and converge towards the trailing edge, the groove being appropriately tapered in plan. Thus the area of the platform 1d towards the trailing edge of the blade would be further reduced. The blade would be inserted in the groove at the leading edge end thereof.

In the embodiment of Figures 12 and 13, the loops follow the contour of the blade along the whole chordwise length of both faces so that the platforms 1d are entirely eliminated, and the blade section is loaded wholly in tension. The root end of the blade is embedded in a root block 14 which is cast thereon. In this embodiment, the wedging action of the wire will be supplemented by any adhesion between the blade part 1 and the cast metal of the root block.

The blade part proper 1 may be made of sheet steel, aluminium alloy or titanium alloy. Instead of being made from sheet material bent to shape on a former, it could be constituted by tubular material of the required cross-section as shown in Figure 6. The tube is slit for the required distance from the root end along the leading and trailing edges and the portions below the top of the slits are deformed to constitute the loops as already described.

I claim:

1. A blade for a compressor, turbine or like bladed fluid flow machine comprising a hollow tubular part of cambered aerofoil cross-section for at least part of its length and having a concave face and a convex face, each said face having a portion formed into a loop extending in a chordwise since along its edge at its root end, said loop being being wedge-shaped in cross-section with its apex pointing towards the tip end of the blade; a wire extending in a chordwise sense through each said loop, said wires being wedge-shaped and conforming in cross-section to the inside of the loop and being a close fit therein; and a root block formed in its surface with two spaced dovetail grooves conforming in cross-section to the outside of the loops, the loops engaging and being a close fit in the grooves.

2. A blade for a compressor, turbine or like bladed fluid flow machine comprising a hollow tubular part of cambered aerofoil cross-section for at least part of its length and having a concave face and a convex face, each said face having a portion formed into a loop extending in a chordwise sense along its edge at its root end, said loop being wedge-shaped in cross-section with its apex pointing towards the tip end of the blade; a wire extending in a chordwise sense through each said loop, said wires being wedge-shaped and conforming in cross-section to the inside of the loops and being a close fit therein; and a root block cast around and enveloping said loops.

3. A blade according to claim 2 wherein the loop formed on each said face is curved to conform to the contour of that face.

4. A blade for a compressor, turbine or like bladed fluid flow machine comprising a hollow tubular part of cambered aerofoil cross-section for at least part of its length and having a concave and a convex face, each said face having a portion formed into a loop extending in a chordwise sense along its edge at its root end, said loop being wedge-shaped in cross-section with its apex pointing towards the tip end of the blade; a wire extending in a chordwise sense through each said loop, said wires being wedge-shaped and conforming in cross-section to the inside of the loops and being a close fit therein; and a root block formed in one surface with two spaced dovetail grooves which extend to at least one of the end faces of the block, said grooves conforming in cross-section to the outside of the loops, the loops engaging and being a close fit therein.

5. A blade according to claim 4 wherein at least one of the loops is curved to conform for at least part of its length to the contour of the face on which it is formed.

6. A blade according to claim 4 wherein the loops, wires and grooves are parallel to one another.

7. A blade for a compressor, turbine or like bladed fluid flow machine comprising a hollow tubular part of cambered aerofoil cross-section for at least part of its length and having a concave and a convex face, each said face having a portion formed into a loop extending in a chordwise sense along its edge at its root end, each said loop being wedge-shaped in cross-section with its apex pointing towards the tip end of the blade, and at least one of said loops being curved to conform for at least part of its length to the contour of the face on which it is formed; a wire extending in a chordwise sense through each said loop, said wires being wedge-shaped and conforming in cross-section to the inside of the loops and being a close fit therein; and a root block formed in its surface with two spaced dovetail grooves conforming in cross-section to the outside of the loops, the loops engaging and being a close fit in the grooves.

References Cited in the file of this patent

UNITED STATES PATENTS

| | | |
|---|---|---|
| 902,526 | Farquhar | Oct. 27, 1908 |
| 943,348 | Hodgkinson | Dec. 14, 1909 |
| 1,035,364 | Leblanc | Aug. 13, 1912 |
| 2,047,502 | Wettstein | July 14, 1936 |
| 2,559,013 | Eastman | July 3, 1951 |
| 2,631,004 | Swansen | Mar. 10, 1953 |
| 2,656,146 | Sollinger | Oct. 20, 1953 |

FOREIGN PATENTS

| | | |
|---|---|---|
| 21,756 | Great Britain | 1907 |
| 426,763 | Italy | Nov. 6, 1947 |
| 731,449 | France | May 30, 1932 |

OTHER REFERENCES

S. A. E. Journal, page 34, February 1948.